(12) United States Patent
Iftime et al.

(10) Patent No.: US 7,709,164 B2
(45) Date of Patent: May 4, 2010

(54) SOLVENT-LESS PROCESS FOR PRODUCING TRANSIENT DOCUMENTS

(75) Inventors: Gabriel Iftime, Mississauga (CA); Peter M Kazmaier, Mississauga (CA); Naveen Chopra, Oakville (CA); San-Ming Yang, Troy, NY (US); Raymond W Wong, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/930,732

(22) Filed: Oct. 31, 2007

(65) Prior Publication Data

US 2008/0044747 A1 Feb. 21, 2008

Related U.S. Application Data

(62) Division of application No. 11/215,950, filed on Aug. 30, 2005.

(51) Int. Cl.
*G03F 7/00* (2006.01)
*G03F 7/004* (2006.01)

(52) U.S. Cl. ............... 430/19; 430/270.1; 430/330; 430/962

(58) Field of Classification Search .......... 430/270.1, 430/19, 330, 962
See application file for complete search history.

(56) References Cited

U.S. PATENT DOCUMENTS

| | | | |
|---|---|---|---|
| 3,961,948 A | 6/1976 | Saeva | |
| 5,300,511 A * | 4/1994 | Yoo et al. | 514/278 |
| 5,300,661 A | 4/1994 | Nakatsuka et al. | |
| 5,312,868 A | 5/1994 | Abe et al. | |
| 5,372,917 A | 12/1994 | Tsuchida et al. | |
| 5,503,781 A * | 4/1996 | Sumii et al. | 264/4.7 |
| 5,524,934 A | 6/1996 | Schwan et al. | |
| 5,565,276 A | 10/1996 | Murakami et al. | |
| 5,710,420 A | 1/1998 | Martin et al. | |
| 5,803,505 A | 9/1998 | Schwan et al. | |
| 6,077,642 A | 6/2000 | Ogata et al. | |
| 6,358,655 B1 | 3/2002 | Foucher et al. | |
| 6,365,312 B1 | 4/2002 | Foucher et al. | |

(Continued)

FOREIGN PATENT DOCUMENTS

EP 414476 A1 * 2/1991

*Primary Examiner*—Amanda C. Walke
(74) *Attorney, Agent, or Firm*—MH2 Technology Law Group

(57) ABSTRACT

An image forming method including (a) providing a reimageable medium comprised of a substrate and a photochromic material, wherein the medium is capable of exhibiting a color contrast and an absence of the color contrast; (b) exposing the medium to an imaging light corresponding to a predetermined image to result in an exposed region and a non-exposed region, wherein the color contrast is present between the exposed region and the non-exposed region to allow a temporary image corresponding to the predetermined image to be visible for a visible time; (c) subjecting the temporary image to an indoor ambient condition for an image erasing time to change the color contrast to the absence of the color contrast to erase the temporary image without using an image erasure device; and (d) optionally repeating procedures (b) and (c) a number of times to result in the medium undergoing a number of additional cycles of temporary image formation and temporary image erasure, wherein the reimageable medium is prepared by a solvent-less process comprising i) heating and melting a photochromic material and a polymer to form a coating composition, and ii) coating the coating composition onto at least one side of a transient document substrate.

14 Claims, 1 Drawing Sheet

U.S. PATENT DOCUMENTS

| | | |
|---|---|---|
| 6,500,245 B1 | 12/2002 | McCue et al. |
| 6,635,602 B1 | 10/2003 | Taylor et al. |
| 6,815,679 B2 * | 11/2004 | Azuma .................... 250/316.1 |
| 7,205,088 B2 * | 4/2007 | Iftime et al. ............. 430/270.1 |
| 7,214,456 B2 * | 5/2007 | Iftime et al. .................. 430/19 |
| 7,300,727 B2 * | 11/2007 | Kazmaier et al. ............. 430/19 |

* cited by examiner

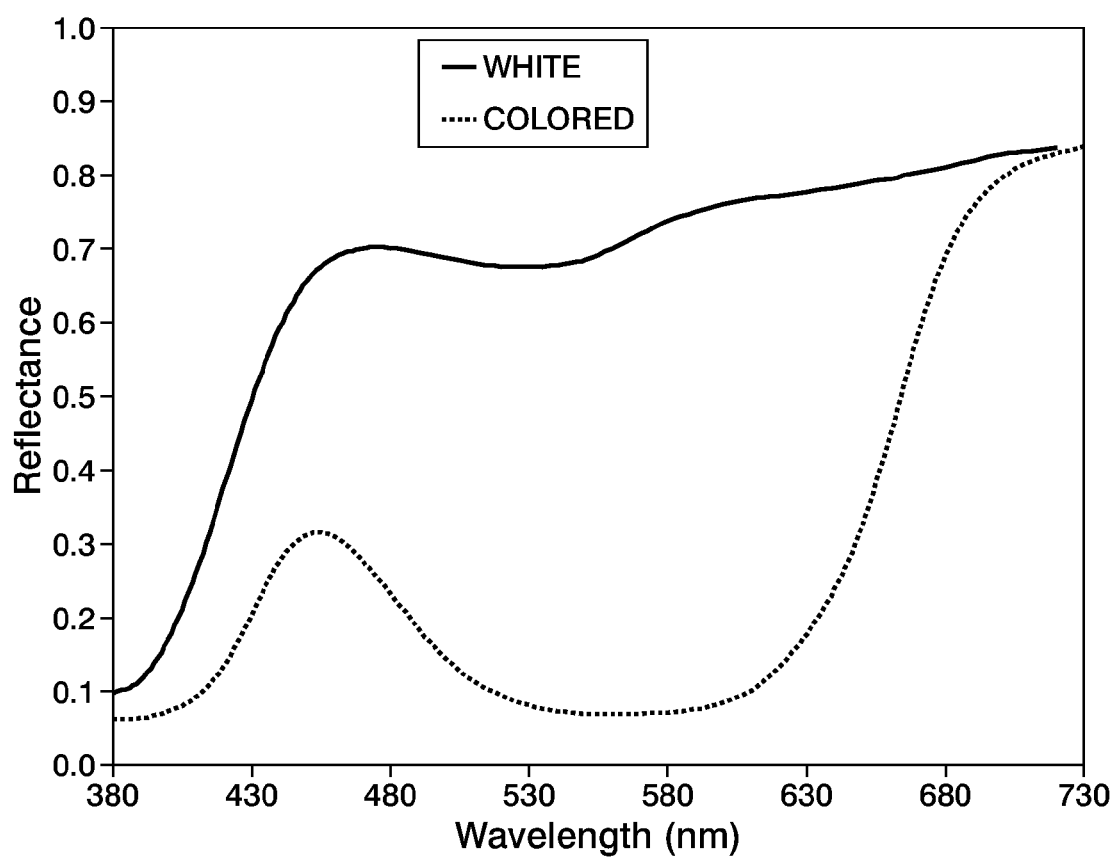

SOLVENT-LESS PROCESS FOR PRODUCING TRANSIENT DOCUMENTS

CROSS-REFERENCE TO RELATED APPLICATIONS

This is a divisional of U.S. application Ser. No. 11/215,950 filed Aug. 30, 2005 by the same inventors, and claims priority therefrom. This divisional application is being filed in response to a restriction requirement in that prior application. The disclosure of this reference is hereby incorporated by reference in its entirety.

BACKGROUND

Herein are described transient or temporary documents suitable for use in electrostatographic or electrophotographic printing or copying processes. More specifically, herein are described coated transient documents used in electrostatographic or electrophotographic recording processes, including electrostatography, electrophotography, xerography, ionography, digital, and the like, the transient documents are prepared by a solvent-less coating process. This process for coating transient documents dispenses with the need for solvents, which, when used, can be costly and dangerous to the environment. The current solvent-less process involves dissolving photochromic compounds in melted polymer or resin materials, and coating the recording material with the melted composition. In embodiments, the photochromic compounds are spiropyrans.

Transient documents are reimageable recording mediums, wherein the recording medium is capable of exhibiting a color contrast and an absence of color contrast. More specifically, a) the transient document is exposed to an imaging light corresponding to a predetermined image to result in an exposed region and a non-exposed region, wherein the color contrast is present between the exposed region and the non-exposed region to allow a temporary image corresponding to the predetermined image to be visible for a visible time. Next, b) the temporary image is subjected to an indoor ambient condition for an image erasing time to change the color contrast to the absence of the color contrast to erase the temporary image without using an image erasure device. Optionally, procedures a) and b) can be repeated a number of times to result in the medium undergoing a number of additional cycles of temporary image formation and temporary image erasure.

Disclosures of transient documents include the following.

Sebastian V. Kanakkanatt, "Photoerasing Paper and Thermocoloring Film," SPIE, Vol. 3227, pp. 218-224 (1997).

Henri Bouas-Laurent et al., "Organic Photochromism," Pure Appl. Chem., Vol. 73, No. 4, pp. 639-665 (2001).

Martin et al., U.S. Pat. No. 5,710,420.

McCue et al., U.S. Pat. No. 6,500,245 B1.

Japanese Patent Document Laid Open No. 2003-131339 ("Reversible Image Display Medium, Method and Device").

I. Kawashima et al., "20.4: Photon-Mode Full-Color Rewritable Image Using Photochromic Compounds," SID 03 DIGEST, pp. 851-853 (2003).

H. Hattori et al., "Development of Paper-like Rewritable Recording Media and Systems," Asia Display/IDW '01, pp. 15-18 (2001).

Saeva, U.S. Pat. No. 3,961,948.

Foucher, et al., U.S. Pat. No. 6,358,655 B1.

Foucher et al., U.S. Pat. No. 6,365,312 B1.

Known processes for preparing recording mediums, which are not considered transient documents, include the use of solvents along with spiropyrans.

For example, U.S. Pat. No. 6,635,602 discloses use of organic solvents and fluoran compounds in a process for making recording materials. The patent discloses that spiropyrans can be added to the fluorans as color forming compounds in the paper itself.

U.S. Pat. No. 6,077,642 discloses use of a spiropyran as an electron donating dye in the process of making a recording material.

U.S. Pat. No. 5,803,505 discloses use of spiropyrans as color formers in a process for making a recording material having a multi-color imageable surface. The color formers comprise from about 5 to about 15 percent by weight of the coating composition.

U.S. Pat. No. 5,565,276 discloses a method for making anti-falsification paper using spiropyran as a fluorescent dye.

U.S. Pat. No. 5,524,934 discloses use of spiropyrans as color formers in a process for making a recording material having a multi-color imageable surface. The color formers comprise from about 5 to about 15 percent by weight of the coating composition.

U.S. Pat. No. 5,372,917 teaches use of spiro-based dyes and 3-methylnaphtho(6'-methoxybenzo)spiropyran in the process for making a recording material.

U.S. Pat. No. 5,312,686 discloses use of a spiropyran in the formation of recording materials.

U.S. Pat. No. 5,300,661 discloses use of a fluoran compound and possible spiropyran in order to adjust the developed hue in a process for making a recording material.

A need remains for an improved process for producing transient documents, which dispenses with the need for solvents, and produces a transient document that has performance equivalent to the transient documents produced by known solvent-based methods. Solvents, when used, can be costly and dangerous to the environment. Solvent containment is needed in known methods in order to avoid release of solvents into the atmosphere. The present solvent-less process dispenses with the need for solvent containment. In addition, solvents are flammable, and there is a risk of fire during the fabrication process. With the current solvent-less process, this risk is eliminated. Moreover, using solvents requires the need for heating in order to fully evaporate the remaining solvent. Incomplete evaporation of the solvent may leave the smell of residual solvent on the transient document. The current solvent-less process dispenses with the need for heating, and with the possibility of adverse smell associated with solvent use. The current solvent-less process involves dissolving photochromic compounds in melted polymer or resin materials, and coating the transient document with the melted composition. In embodiments, the photochromic compounds are spiropyrans.

SUMMARY

Embodiments include an image forming method comprising: (a) providing a reimageable medium comprised of a substrate and a photochromic material, wherein the medium is capable of exhibiting a color contrast and an absence of the color contrast; (b) exposing the medium to an imaging light corresponding to a predetermined image to result in an exposed region and a non-exposed region, wherein the color contrast is present between the exposed region and the non-exposed region to allow a temporary image corresponding to the predetermined image to be visible for a visible time; (c) subjecting the temporary image to an indoor ambient condition for an image erasing time to change the color contrast to the absence of the color contrast to erase the temporary image without using an image erasure device; and (d) optionally repeating procedures (b) and (c) a number of times to result in the medium undergoing a number of additional cycles of temporary image formation and temporary image erasure, wherein the reimageable medium is prepared by a solventless process comprising i) heating and melting a photochromic material and a crystalline polymer to form a coating composition, and ii) coating the coating composition onto at least one side of a transient document substrate.

BRIEF DESCRIPTION OF THE DRAWINGS

Reference may be had to the accompanying drawing, which includes:

FIG. 1 is a graph of reflectance versus nanometers and shows the reflectance spectra of an embodiment of a transient document in the white and colored states.

DETAILED DESCRIPTION

The present method involves providing a reimageable medium composed of a substrate and a photochromic material, wherein the medium is capable of exhibiting a color contrast and an absence of the color contrast. The reimageable medium is exposed to an imaging light corresponding to a predetermined image to result in an exposed region and a non-exposed region, wherein the color contrast is present between the exposed region and the non-exposed region to allow a temporary image corresponding to the predetermined image to be visible to the naked eye. The transient document is capable of self-erasing, especially at room temperature.

To erase the temporary image, the present method subjects the temporary image to an indoor ambient condition for an image erasing time to change the color contrast to the absence of the color contrast to erase the temporary image without using an image erasure device, wherein the temporary image is visible for a visible time sufficient for the observer to view the temporary image but wherein the visible time is limited to permit the optional feature of repeating the procedures described herein for temporary image formation and temporary image erasure a number of times to result in the medium undergoing a number of additional cycles of temporary image formation and temporary image erasure. Fast erasing is achieved by heating the transient document at a temperature below the melting temperature of the crystalline polymeric binder. In embodiments, the reimageable medium may be considered "self-erasing."

The imaging light may have any suitable predetermined wavelength scope of a single wavelength or a band of wavelengths. In embodiments, the imaging light is an ultraviolet light having a single wavelength or a narrow band of wavelengths selected from the ultraviolet light wavelength range of about 200 nm to about 475 nm, particularly a single wavelength at 365 nm or a wavelength band of about 360 nm to about 370 nm. For each temporary image, the reimageable medium is exposed to the imaging light for a time period ranging from about 10 milliseconds to about 5 minutes, particularly from about 30 milliseconds to about 1 minute. The imaging light has an intensity ranging from about 0.1 mW/cm$^2$ to about 100 mW/cm$^2$, particularly from about 0.5 mW/cm$^2$ to about 10 mW/cm$^2$.

In embodiments, imaging light corresponding to the predetermined image can be generated for example by a computer on a Light Emitting Diode (LED) array screen and the temporary image is formed on the reimageable medium by placing the medium on the LED screen for the preferred period of time. UV LED arrays of for example 396 nm are produced by EXFO (Mississauga, ON, Canada). Another suitable procedure for generating the imaging light corresponding to the predetermined image is the use of UV Raster Output Scanner (ROS).

The color contrast to render the temporary image visible to an observer can be a contrast between for example two, three or more different colors. The term "color" encompasses a number of aspects such as hue, lightness, and saturation where one color can be different from another color if the two colors differ in at least one aspect. For example, two colors having the same hue and saturation but are different in lightness would be considered different colors. Any suitable colors (e.g., red, white, black, gray, yellow and purple) can be used to produce the color contrast as long as the temporary image is visible to the naked eye. In embodiments, the following exemplary color contrasts can be used: purple temporary image on a white background; yellow temporary image on a white background; dark purple temporary image on a light purple background; and light purple temporary image on a dark purple background.

In embodiments, the color contrast may change (e.g., diminish) during the visible time, but the phrase "color contrast" encompasses any degree of color contrast sufficient to render a temporary image discernable to the observer regardless whether the color contrast changes or is constant during the visible time.

The visible time for the temporary image ranges for example from about 1 hour to about 5 days, or from about 3 hours to about 24 hours. In embodiments, fading of the temporary image (due to a decrease in the color contrast) may be noticeable within the visible time described herein, but the visible time indicates the time period when the temporary image is discernable to the naked eye.

The indoor ambient condition is composed of darkness at ambient temperature, or indoor ambient light at ambient temperature, or both the darkness at ambient temperature and the indoor ambient light at ambient temperature. The indoor ambient light is for example the typical office lighting where the indoor ambient light may be entirely artificial light (e.g., light from an incandescent bulb and/or fluorescent bulb), or entirely sunlight coming in through a glass window, or a mixture of artificial light and sunlight coming through a glass window. Where the indoor ambient condition includes darkness at ambient temperature, the term "darkness" refers to a low light level where the office lighting is turned off and where there is insignificant amount of sunlight entering the room (e.g., there is no window or the sun has set or the window drapes/blinds are closed). The term "darkness" also encompasses the nighttime situation where the office lighting is turned off, but there are "city lights" streaming into the room through the window. In embodiments of the present method, the reimageable medium with the temporary image is exposed to the indoor ambient condition for an image erasing time ranging for example from about 1 hour to about 5 days, or from about 3 hours to about 24 hours. In embodiments, since the temporary image typically remains under an indoor ambient condition during the entire visible time, the image erasing time includes the visible time. For example, if the temporary image is visible for 5 hours, then the image erasing time could be any value of 5 plus hours. In embodiments, the image erasing time exceeds the visible time by a time period of for example at least 30 minutes, or from about 1 hour to about 24 hours.

In embodiments, use of a transient document allows for erasure of the temporary image by any of the following: (i) changing the color of the exposed region (that is, exposed to the imaging light) to the color of the non-exposed region (that is, not exposed to the imaging light); (ii) changing the color of the non-exposed region to the color of the exposed region; or (iii) changing the color of the exposed region and of the color of the non-exposed region to the same color different from both the exposed region color and the non-exposed region color.

The photochromic material exhibits photochromism, which is a reversible transformation of a chemical species induced in one or both directions by absorption of electromagnetic radiation between two forms having different absorption spectra. The first form is thermodynamically stable which can be induced by absorption of light to convert to a second form. The back reaction from the second form to the first form can occur for example thermally or by absorption of light. Embodiments of the photochromic material also encompass the reversible transformation of the chemical species among three or more forms in the event it is possible that reversible transformation can occur among more than two forms. The photochromic material may be composed of one, two, three or more different types of photochromic materials, where the term "type" refers to each family of reversibly interconvertible forms, e.g., spiropyran and its isomer merocyanine collectively forming one type (also referred to as one family) of photochromic material. Unless otherwise noted, the term "photochromic material" refers to all molecules of the photochromic material regardless of form. For example, where the photochromic material is of a single type such as spiropyran/merocyanine, at any given moment the molecules of the photochromic material may be entirely spiropyran, entirely merocyanine, or a mixture of spiropyran and merocyanine. In embodiments, for each type of photochromic material, one form is colorless or weakly colored and the other form is differently colored.

When two or more types of photochromic materials are present, each type may be present in an equal or unequal amount by weight ranging for example from about 5% to about 90% based on the weight of all types of the photochromic material.

In embodiments, the photochromic material is also thermochromic, i.e., exhibits thermochromism which is a thermally induced reversible color change.

Any suitable photochromic material may be used, especially an organic photochromic material. Examples of suitable photochromic materials include compounds that undergo heterocyclic cleavage, such as spiropyrans and related compounds; compounds that undergo homocyclic cleavage such as hydrazine and aryl disulfide compounds; compounds that undergo cis-trans isomerization such as azo compounds, stilbene compounds and the like; compounds that undergo proton or group transfer phototautomerism such as photochromic quinines; compounds that undergo photochromism via electro transfer such as viologens and the like; and others such as diarylethenes, which undergo photochromism via ring closure.

As discussed herein, the photochromic material can exist in a number of forms, which are depicted herein by illustrative structural formulas for each type of photochromic material. For the chemical structures identified herein one form of the photochromic material is typically colorless or weakly colored (e.g., pale yellow); whereas, the other form typically has a different color (e.g., red, blue, or purple) which is referred herein as "differently colored."

Included in the image-receiving coating of the transient document is a photochromic compound. The image-receiving coating is prepared by first dissolving a photochromic compound in melted polymer, for example, polyethylene (such as Polywax®) followed by mixing, to provide a homogeneous hot solution. The substrate is then coated with the melted composition by using any coating process, for example blade coating, while the composition is maintained hot. Any suitable technique may be used to form the reimageable medium. For example, to deposit the components described herein, typical coating techniques include, but are not limited to spin coating, dip coating, spray coating, draw bar coating, doctor blade coating, slot coating, roll coating and the like. These recording sheets behave in the same or similar manner to transient documents that are prepared using solvents.

Examples as discussed herein, the photochromic material may exist in a number of forms. Examples of suitable photochromic compounds include spiropyrans, spirooxazines, spirothiopryans, stilbenes, aromatic azo compounds, benzo and naphthopyrans (chromenes), bisimidazoles, spirodihydroindolizines and related systems (such as tetrahydro- and hexahydroindolizine), photochromic quinines, perimidinespirocyclohexadienones, photochromic viologens, fulgides and fulgimides, diarylethenes, triarylmethanes, anils, and the like, and mixtures thereof.

Examples of spiropyrans compounds include spiro[2H-1-benzopyran-2,2'-indolines]; spirooxazines, for example, spiro[indoline-2,3'-[3H]-naphtho[2,1-b]-1,4-oxazines]; and spirothiopryans, for example, spiro[2H-1-benzothiopyran-2,2'-indolines].

While the above classes of compounds have been identified, the examples of photochromic compounds are not limited to just these compounds, but also include the analogue compounds and the like. Suitable examples of the spiropyrans compounds and analogue compounds include those having the general formulas (the closed form may be colorless/weakly colored; the open form may be differently colored), as follows:

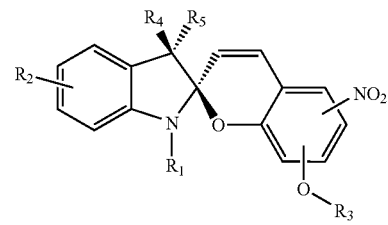

wherein $R_1$, $R_2$, $R_3$, $R_4$, and $R_5$, can be the same or different and can be hydrogen, an alkyl having from about 1 to about 50 carbons, or from about 1 to about 30 carbons such as methyl, ethyl, propyl, and the like; a cyclic alkyl group having from about 4 to about 30 carbons, or from about 4 to about 8 carbons such as cyclopropyl, cyclohexyl, and the like; an unsaturated alkyl group having from about 1 to about 50 carbons, or from about 1 to about 30 carbons, such as vinyl ($H_2C=CH-$), allyl ($H_2C=CH-CH_2-$), propynyl (HC≡C—CH₂—), and the like; an aryl having from about 6 to about 30 carbon atoms, or with from about 6 to about 20 carbon atoms; and an arylalkyl having from about 7 to about 50 carbon atoms, or from about 7 to about 30 carbon atoms.

Other examples include:

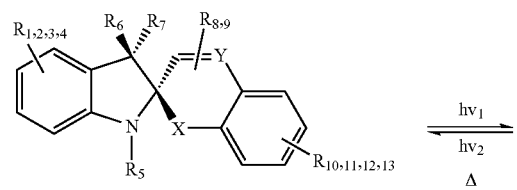

Closed form (Spiropyran when X = O and Y = CH)

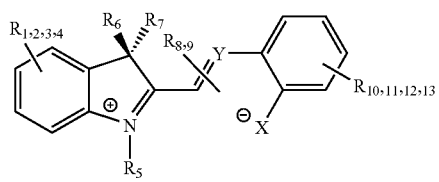

Open form (Merocyanine when X = O and Y = CH)

wherein $R_1$, $R_2$, $R_3$, $R_4$, $R_5$, $R_6$, $R_7$, $R_8$, $R_9$, $R_{10}$, $R_{11}$, $R_{12}$ and $R_{13}$ can be the same or different and each, independently of the others can be (but are not limited to) hydrogen, alkyl having from about 1 to about 50, or from about 1 to about 30 carbons, such as methyl, ethyl, propyl, and the like, and including cyclic alkyl having from about 4 to about 30 carbons, or from about 4 to about 8 carbons, such as cyclopropyl, cyclohexyl, and the like; an unsaturated alkyl group having from about 1 to about 50 carbons, or from about 1 to about 30 carbons, such as vinyl (H₂C═CH—), allyl (H₂C═CH—CH₂—), propynyl (HC≡C—CH₂—), and the like; an aryl having from about 4 to about 30 carbon atoms, or from about 6 to about 20 carbon atoms; an arylalkyl having from about 7 to about 50 carbon atoms, or from about 7 to about 30 carbon atoms; silyl groups; nitro groups; cyano groups; halide atoms such as fluoride, chloride, bromide, iodide, and astatide; amine groups including primary, secondary, and tertiary amines, hydroxy groups, alkoxy groups with from 1 to about 50 carbon atoms, or from 1 to about 30 carbon atoms; an aryloxy group with from about 6 to about 30 carbon atoms, or with from about 6 to about 20 carbon atoms; an alkylthio group with from 1 to about 50 carbon atoms, or from 1 to about 30 carbon atoms; an arylthio group with from about 6 to about 30 carbon atoms, or from about 6 to about 20 carbon atoms; aldehyde groups; ketone groups; ester groups; amide groups; carboxylic acid groups; sulfonic acid groups; and the like. The alkyl, aryl, and arylalkyl groups can also be substituted with groups such as, for example, silyl groups; nitro groups; cyano groups; halide atoms such as fluoride, chloride, bromide, iodide, and astatide; amine groups including primary, secondary, and tertiary amines; hydroxy groups; alkoxy groups having from about 1 to about 20 carbon atoms, or from about 1 to about 10 carbon atoms; aryloxy groups having from about 6 to about 20 carbon atoms, or from about 6 to about 10 carbon atoms; alkylthio groups with from 1 to about 20 carbon atoms, or from 1 to about 10 carbon atoms; arylthio groups having from about 6 to about 20 carbon atoms, or from about 6 to about 10 carbon atoms; aldehyde groups; ketone groups; ester groups; amide groups; carboxylic acid groups; sulfonic acid groups; and the like. Further, two or more R groups (that is, $R_1$ through $R_{13}$) can be joined together to form a ring. X can be Oxygen atom (O) or Sulphur atom (S). Y can be CH group, Nitrogen atom (N) or Phosphorus atom (P). Compounds with X═O and Y═CH, are known as spiropyrans. In this case, the closed form isomer is known as spiropyran compound, while the open form isomer is known as merocyanine compound. Compounds with X═O and Y═N, are known as spirooxazines. Compounds with X═S and Y═CH are known as spirothiopyrans.

Examples of spiropyrans include spiro[2H-1-benzopyran-2,2'-indolines], including those of the general formula I wherein substituents can be present on one or more of the 1', 3', 4', 5', 6', 7', 3, 4, 5, 6, 7, and 8 positions; spiroindolinonaphthopyrans, including those of the general formula II, wherein substituents can be present on one or more of the 1, 3, 4, 5, 6, 7, 1', 2', 5', 6', 7', 8', 9' or 10' positions; azaspiroindolinopyrans, including those of the general formula III, wherein substituents can be present on one or more of the 3, 4, 5, 6, 7, 3', 4', 5', 6', 7', 8', and 9' positions and examples include:

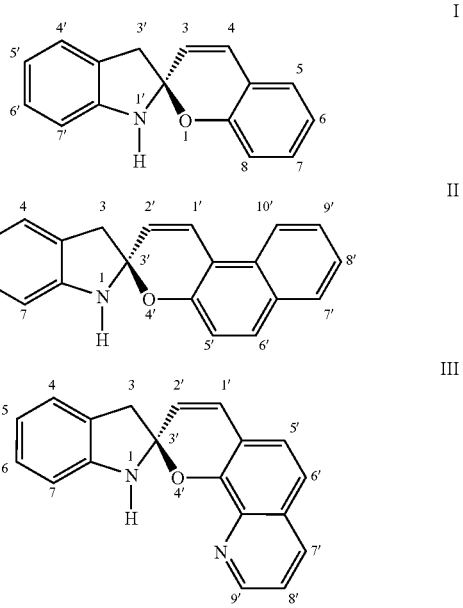

Examples of spirooxazines include spiro[indoline-2,3'-[3H]-naphtho[2,1-b]-1,4-oxazines], including those of the general formula IV below, wherein substituents can be present on one or more of the 1, 3, 4, 5, 6, 7, 1', 2', 5', 6', 7', 8', 9', or 10' positions; spiro[2H-1,4-benzoxazine-2,2'-indolines], including those of the general formula V below, wherein substituents can be present on one or more of the 3, 5, 6, 7, 8, 1', 4', 5', 6', and 7' positions; and the like.

Examples of spirothiopyrans include spiro[2H-1-benzothiopyran-2,2'-indolines], including those of the general formula VI, wherein substituents can be present on one or more of the 1', 3', 4', 5', 6', 7', 3, 4, 5, 6, 7, and 8 positions, and the like.

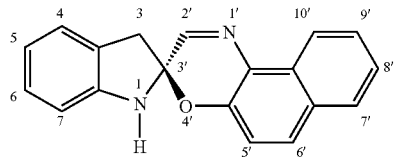

IV

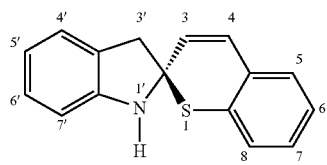

V

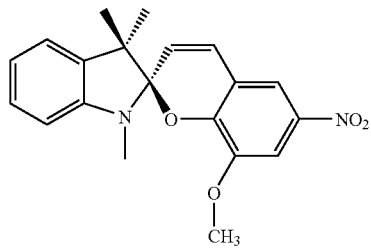

(SP isomer)

Compound 2

In other embodiments, examples of suitable spiropyrans include those having the following formulas:

VI

In all of the above examples of spiropyrans, spirooxazines and spirothiopyrans, examples of substituents are the same as described for $R_1$, $R_2$, $R_3$, $R_4$, $R_5$, $R_6$, $R_7$, $R_8$, $R_9$, $R_{10}$, $R_{11}$, $R_{12}$ and $R_{13}$.

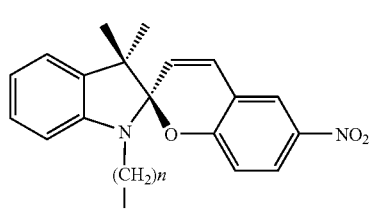

(SP isomer)

Compound 3 wherein n is a number of from about 0 to about 30, or from about 0 to about 20, or from about 1 to about 10.

Compound 2 above have increased solubility in polymers, for example, in polyethylene such as Polywax®. Only SP clear state isomers are shown above. Other isomers can be used.

Other examples of compounds having increased solubility in polymers, such as polyethylene, include Compound 3 above. In the structure above, alternatively, alkyl groups may be placed in other unsubstituted positions on the spiropyran.

Spiropyran switches from a clear state (SP) a colored isomer (merocyanine; MC) under illumination with UV light as shown below as Compound 1 changes.

Compound 1

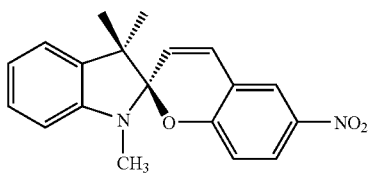

Spiropyran (SP-1)
Colorless $\underset{\Delta}{\overset{h\nu_1}{\rightleftharpoons}}$

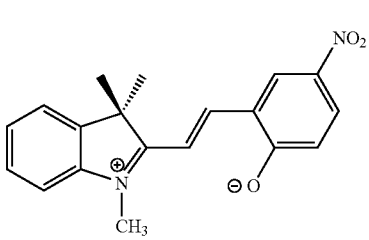

Merocyanine (MC-1)
Colored

Electron donor substituents like, for example, amino, alkoxy or groups and electron donor substituents like for example nitro or cyan on spiropyran, spirooxazine, and spirothiopyran can be adjusted to affect the color of the open form of the photochromic material, as well as the absorption spectrum of the closed form. Substituents on the central moiety of the spiropyrans, spirooxazines, and spirothiopyrans, or on alkyl or aryl groups attached thereto also affect the color of the open form of the photochromic material, although to a lesser degree than substituents on the left ring. Further, substituents can be tuned as to affect the solubility of the compound in various liquids and resins. Substituents with long chain hydrocarbons, such as those with 16 or 18 carbon atoms, can increase solubility in hydrocarbons. Sulfonate and carboxylate groups, for example, can enhance water solubility.

Specific examples of spiropyrans, spirooxazines, and spirothiopyrans include 1',3'-dihydro-1',3',3'-trimethyl-6-nitrospiro-[2H-1-benzopyran-2,2'-(2H)-indole]; 1',3'-dihydro-1',3',3'-trimethyl-5'-nitrospiro-[2H-1-benzopyran-2,2'-(2H)-indole 1',3'-dihydro-1',3',3'-trimethyl-6-cyano-spiro-[2H-1-benzopyran-2,2'-(2H)-indole], 1',3'-dihydro-1',3',3'-trimethyl-8-nitrospiro-[2H-1-benzopyran-2,2'-(2H)-indole], 1',3'-dihydro-1',3',3'-trimethyl-6-nitro, 8-methoxy-spiro-[2H-1-benzopyran-2,2'-(2H)-indole], 1',3'-dihydro-1'-decyl-,3',3'-dimethyl-6-nitrospiro-[2H-1-benzopyran-2,2'-(2H)-indole]; 1,3-dihydro-1,3,3-trimethylspiro[2H-indole-2,3'-[3H]naphth[2,1-b]-[1,4]oxazine], 1,3-dihydro-1,3,3-trimethyl-5-nitrospiro[2H-indole-2,3'-[3H]naphth[2,1-b]-[1,4]oxazine]-1,3-dihydro-1,3,3-trimethyl-5,6'-dinitro-spiro [2H-indole-2,3'-[3H]naphth[2,1-b]-[1,4]oxazine], 1,3-dihydro-1,3,3-trimethyl-5-methoxy, 5'-methoxy-spiro[2H-indole-2,3'-[3H]naphth[2,1-b]-[1,4]oxazine], 1,3-dihydro-1-ethyl-3,3-dimethyl-5'-nitrospiro[2H-indole-2,3'-[3H]naphth [2,1-b]-[1,4]oxazine], 1,3',3'-trimethylspiro[2H-1-benzothiopyran-2,2'-indoline].

A representative methodology for synthesis of spiropyrans is by condensation of a readily available Fisher's base with salicylaldehyde derivatives. Extensive coverage of synthetic procedures and references are described in J. C. Crano and R. J. Guglielmetti, Organic Photochromic and Thermochromic Compounds, Vol. 1, Main Photochromic Families (Topics in Applied Chemistry), Plenum Press, New York (1999), the disclosure of which is totally incorporated herein by reference.

In embodiments, the photochromic compound is present in the outer coating in an amount of from about 0.01 to about 50 percent, or from 1 to about 10 percent by weight of total solids in the coating.

The polymeric binder is a crystalline polymer, i.e. which melts at a defined temperature when heated. When in the melted state, the polymer behaves like a liquid, and dissolves the photochromic compound. The liquid behavior of the melted polymer allows preparation of a liquid composition made of melted polymer binder, photochromic compound and any other optional additives, which can be coated while hot. After coating onto the substrate, when the heat is removed, the coating composition becomes solid, when kept at room temperature, to provide the transient document. No solvent is used for this preparation.

Any crystalline polymer which can dissolve the photochromic compound when is in the melted state is suitable. Examples of suitable crystalline polymers include but are not limited to crystalline polyethylenes; oxidized waxes; crystalline polyethylene copolymers such as for example ethylene/vinyl acetate copolymers, ethylene/vinyl alcohol copolymers, ethylene/acrylic acid copolymers, ethylene/methacrylic acid copolymers, ethylene/carbon monoxide copolymers, polyethylene-b-polyalkylene glycol wherein the alkylene portion can be ethylene, propylene, butylenes, pentylene or the like, and including the polyethylene-b-(polyethylene glycol)s and the like; crystalline polyamides; polyester amides; polyvinyl butyral; polyacrylonitrile; polyvinyl chloride; polyvinyl alcohol hydrolyzed; polyacetal; crystalline poly(ethylene glycol); poly(ethylene oxide); poly(ethylene therephthalate); poly(ethylene succinate); crystalline cellulose polymers; fatty alcohols; ethoxylated fatty alcohols; and the like, and mixtures thereof.

More specific examples of binders include crystalline polyethylenes like Polywax® 2000, Polywax® 1000, Polywax® 500, and the like from Baker Petrolite, Inc.; oxidized wax like for example X-2073 and Mekon wax, which are Baker-Hughes Inc. products; crystalline polyethylene copolymers like, for example, polyethylene-b-polyalkylene glycol wherein the alkylene portion can be ethylene, propylene, butylenes, pentylene or the like, including polyethylene-b-(polyethylene glycol)s and the like, ethylene/vinyl acetate copolymers available for example from DuPont under the trade name Elvax®, ethylene/vinyl alcohol copolymers, ethylene/acrylic acid copolymers, ethylene/methacrylic acid copolymers, ethylene/carbon monoxide copolymers, and the like (many of these copolymers are available at Scientific Polymer Products, Inc.); crystalline polyamides like for example Uni-Rez® 2974, and Uni-Rez® 2981 from Arizona Chemicals, Kemamide S 180, Nylon 6, Nylon 11, Nylon 12, Nylon 6/6, Nylon 6/9, Nylon 6/10 and the like; polyester amides like Uni-Rez® 2980 from Arizona Chemicals; polyvinyl butyral; polyacrylonitrile; polyvinyl chloride; polyvinyl alcohol hydrolyzed; polyacetal; crystalline poly(ethylene glycol); poly(ethylene oxide); poly(ethylene terephthalate); poly(ethylene succinate); crystalline cellulose polymers like, for example, cellulose triacetate and cellulose propionate; fatty alcohols like for example Unilin 350, Unilin 425, Unilin 550 and the like from Baker Petrolite, Inc; ethoxylated fatty alcohols like for example Unithox 325, Unithox 450, Unithox 480 all available from Baker Petrolite, Inc. and the like.

In embodiments, the binder has a melting point of from about 60° C. to about 300° C., or from about 90° C. to about 125° C.

The binder may be composed of one, two, three or more different binders. When two or more different binders are present, each binder may be present in an equal or unequal amount by weight ranging for example from about 5 to about 90 percent, or from about 30 to about 50 percent, based on the weight of total solids.

A light absorbing material, such as an antioxidant, for example, is optionally present and may be composed of one, two or more light absorbing materials. To explain the purpose of the light absorbing material, one first considers that the photochromic material is capable of reversibly converting among a number of different forms, wherein one form has an absorption spectrum that overlaps with the predetermined wavelength scope. The light absorbing material exhibits a light absorption band with an absorption peak, wherein the light absorption band overlaps with the absorption spectrum of the one form of the photochromic material. The phrase "absorption spectrum" refers to light absorption at a range of wavelengths where the light absorption is greater than a minimal amount. Within the absorption spectrum, there is at least one "light absorption band." The phrase "light absorption band" refers to a range of wavelengths where the absorption is at a relatively high level, typically including an absorption peak where the absorption is at the maximum amount for that "light absorption band." The light absorbing material is selected based on its absorption spectrum compared with the absorption spectrum of the one form of the photochromic material. The one form of the photochromic material that is compared with the optional light absorbing material can be any form of the photochromic material based on for example color or thermodynamic stability. In embodiments, the absorption spectrum of the light absorbing material is compared to the absorption spectrum of the more thermodynamically stable form of the photochromic material where for the exemplary reversibly interconvertible forms of spiropyran and merocyanine, spiropyran is considered the more thermodynamically stable form. The phrase "thermodynamically stable form" refers to the compound which is more stable in the absence of external stimuli. For example, a mixture of spiropyran and its corresponding merocyanine of any ratio between the two forms will evolve to 100% spiropyran if given enough time and the mixture is not exposed to stimuli like light. Spiropyran (closed form) is the more thermodynamically stable form.

Any suitable light absorbing materials can be used. Organic molecules and polymeric materials useful for the light absorbing material, a number of which possess high absorbance below the predetermined wavelength scope, are now described.

Organic compounds which may be useful for the light absorbing material include 2-hydroxy-phenones, like for example 2,4-diyhdroxyphenone, 2-(2-hydroxy-5-tert-octylphenyl)benzotriazole, 2-hydroxy-4-n-octoxybenzophenone, 2-(2'-hydroxy-3', 5'-di-tert-amylphenyl)benzotriazole, azobenzene derivatives like for example azobenzene, 4-ethyl azobenzene, 2-chloro-azobenzene, 4-phenylazobenzene, aromatic conjugated systems possessing: (a) at least one aromatic ring such as one, two or more aromatic rings having for instance from about 6 carbon atoms to about 40 carbon atoms such as —$C_6H_4$—, and —$C_6H_4$—$C_6H_4$—; (b) at least one aromatic ring such as one, two or more aromatic rings conjugated through one or more ethenyl or ethynyl bonds having for instance from about 8 carbon atoms to about 50 carbon atoms such as —$C_6H_4$—CH=CH—$C_6H_4$—, and —$C_6H_4$—C=C—$C_6H_4$—; or (c) fused aromatic rings having for instance from about 10 to about 50 carbon atoms such as 1,4-$C_{10}H_6$ and 1,5-$C_{10}H_6$.

Optionally, one or more aromatic rings possess substituents. Such substituents can be for example atoms like N, O, S, where the valence of the atom is satisfied by bonding with H or a hydrocarbon group, aldehyde (—C(O)—H), ketone (—C(O)—R), ester (—COOR), a carboxylic acid (—COOH); cyano (CN); nitro ($NO_2$); nitroso (N=O); a sulfur-based group (e.g., —$SO_2$—$CH_3$; and —$SO_2$—$CF_3$); a fluorine atom; an alkene (—CH=$CR_2$ or —CH=CHR), wherein each R independently may be for example a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl.

Specific examples of organic aromatic conjugated compounds, a number of which may absorb below the predetermined wavelength scope, include for example nitro-benzene, 4-methoxy-benzonitrile, anthracene, anthraquinone, 1-chloro-anthracene and the like.

Some of these light absorbing materials are commercially available for example at Mayzo (BLS®531; BLS®5411; BLS®1710), Ciba (TINUV®234, TINUV® P, TINUV® 1577) and are typically used as UV protective layer to prevent photochemical degradation of polymeric coatings.

Yellow colorants, particularly yellow dyes, useful for the light absorbing material may in embodiments possess strong absorption above the predetermined wavelength scope, along with weak or minimal absorption at the predetermined wavelength scope. The yellow colorant may optionally possess a light absorption band below the predetermined wavelength scope; in this embodiment, the amount of a second light absorbing material absorbing below the predetermined wavelength scope may be decreased or completely eliminated. Azo pyridone yellow dyes, as disclosed in U.S. Pat. Nos. 6,673, 139; 6,663,703; 6,646,101; and 6,590,082 may be suitable, the disclosures of which are totally incorporated herein by reference. The azo pyridone yellow dyes may possess in embodiments very low absorption below 370 nm but high absorption above this wavelength. These azo pyridone yellow dyes can be comprised of either mono-pyridone and mono-anthranilate; dipyridone and bis anthranilate; or dianthranilate and bis-pyridone. Some examples follow:

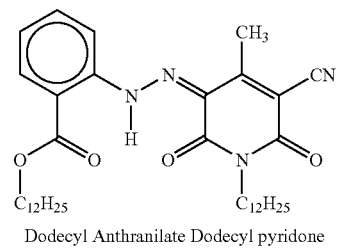

Dodecyl Anthranilate Dodecyl pyridone

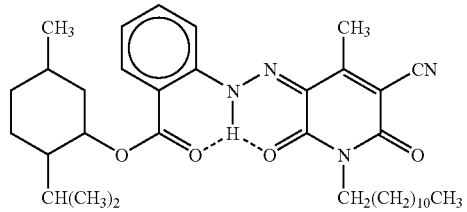

Menthyl Anthranilate Dodecyl Pyridone

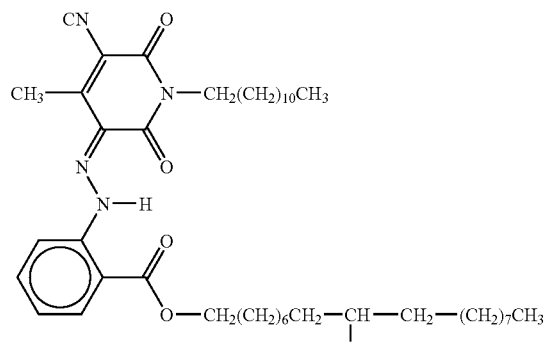

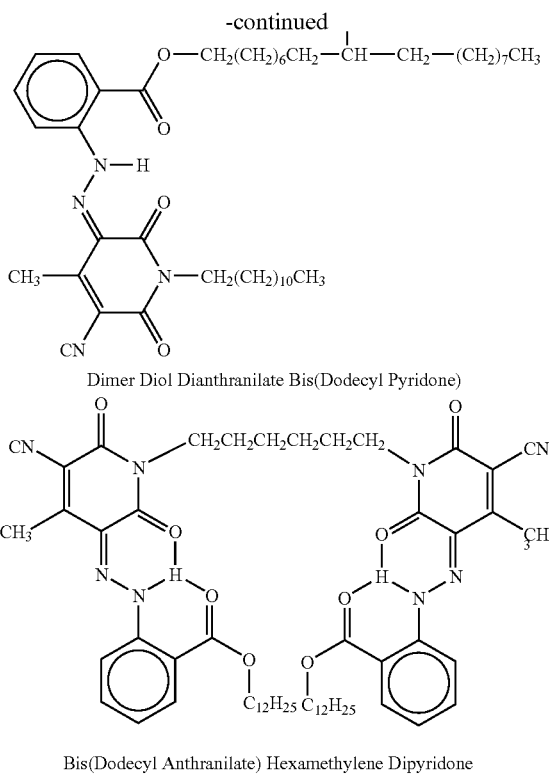

Dimer Diol Dianthranilate Bis(Dodecyl Pyridone)

Bis(Dodecyl Anthranilate) Hexamethylene Dipyridone

In embodiments, a polymeric light absorbing material is used which is composed of an organic moiety (derived from the compounds described herein as being suitable as a light absorbing material) attached to a polymeric backbone. The organic moiety (e.g., azobenzene moiety and azo pyridone moiety) can be part of the polymer backbone of the polymer or the organic moiety can be attached as a side group to the polymer backbone. Suitable examples of the polymeric light absorbing material include substituted polystyrenes, substituted acrylates, substituted methacrylates, substituted polyurethanes, all containing attached or inserted organic moieties as described for the light absorbing organic molecules.

The light absorbing material may be composed of one, two, three or more different light absorbing materials. When two or more different light absorbing materials are present, each light absorbing material may be present in an equal or unequal amount by weight ranging for example from about 5% to 90%, particularly from about 30% to about 50%, based on the weight of all light absorbing materials. The light absorbing material may be in the form of a separate layer over the photochromic material. In another embodiment, the light absorbing material and the photochromic material form a single layer over the substrate. In a further embodiment, the light absorbing material and the photochromic material are both impregnated or embedded into a porous substrate such as paper. When the light absorbing material is present in a separate layer, a binder (as described herein) is optionally used with the light absorbing material in the separate layer where the binder and the light absorbing material are each present in an equal or unequal amount by weight, each ranging for example from about 5% to 90% by weight, particularly from about 30% to about 50% by weight, based on the weight of the binder and the light absorbing material.

A solvent is not needed herein to dissolve the photochromic material, the binder, and the optional light absorbing material to enable processing to create for example a uniform film coating on the substrate. Image-forming coating compositions can be prepared by dissolving a photochromic material into the polymeric binder by heat melting the composition and stirring to provide a homogeneous liquid solution while hot. When light absorbing material is used, this may be dissolved at the same time with the photochromic material.

In embodiments, the substrate is made of a flexible material. The substrate can be transparent or opaque. The substrate may be composed of any suitable material such as wood, plastics, paper (for example, white paper), fabrics, textile products, polymeric films, inorganic substrates such as metals, and the like. The plastic may be for example a plastic film, such as polyethylene film, polyethylene terepthalate, polyethylene napthalate, polystyrene, polycarbonate, and polyethersulfone. The paper may be for example, plain papers such as Xerox® 4024 papers, ruled notebook paper, bond paper, silica coated papers such as Sharp Company silica coated paper, Jujo paper, and the like. The substrate may be a single layer or multi-layer where each layer is the same or different material. The substrate has a thickness ranging for example from about 0.3 mm to about 5 mm.

In embodiments, the substrate (and reimageable medium) has any number of sides such as two (e.g., a sheet of paper), three, four or more sides (e.g., a cube). When one is trying to determine the number of sides of the substrate/medium, it is helpful to consider the intended use of the medium. For example, where the substrate/medium has the configuration of a folder (of the kind for holding loose papers) but the folder is laid relatively flat when viewing the temporary image which stretches across the entire viewing surface, the substrate/medium can be thought of as having two sides (front and back sides). In embodiments, the side can have a curved shape. It is understood that the number of reimageable sides of the medium may be the same as or fewer than the number of sides of the substrate; for example, where the substrate is a sheet of paper and the photochromic material is present only on one side of the paper, then the reimageable medium has only one reimageable side even though the substrate is two-sided.

In embodiments, the substrate has a light color, particularly a white color, on any number of sides such as on one side or on two sides or on all sides.

The substrate/reimageable medium may be rigid or flexible. In fact, the substrate/reimageable medium may have any suitable rigidity or flexibility depending on the intended use for the reimageable medium. In embodiments, the substrate/reimageable medium is capable of undergoing a number of cycles of being rolled up/folded and then unrolled/unfolded. The substrate/reimageable medium has any suitable size such as the dimensions of a business card, the dimensions of a sheet of paper (e.g., A4 and letter sized), or larger, and the like. The substrate/reimageable medium may have any suitable shape such as planar (e.g., a sheet) or non-planar (e.g., cube, scroll, and a curved shape). In embodiments, a plurality of reimageable mediums can also be combined to form a larger reimageable surface analogous to a giant display screen composed of a number of smaller display screens.

The reimageable medium optionally includes a protective material which may reduce chemical degradation of the components of the reimageable medium due to exposure to ambient conditions, especially any chemical reaction involving the photochromic material and oxygen. In this case, the protective layer may contain antioxidant compounds, which act as oxygen scavengers and/or oxygen barrier compounds, which have reduced permeability to oxygen and as a result, prevent oxygen molecules from reaching the photochromic compound. Both of these classes of compounds prevent chemical degradation of the photochromic compound by preventing their degradation by the oxygen molecules. Examples of antioxidant materials include Cibaglrganox® 1010, 1076, 245, which are sterically hindered phenolic compounds. Phenolic antioxidants are also available at the Great Lakes Chemical Corporation, under the trade name Lowinox® and Anox®. Examples of oxygen barrier compounds include, for example, polymers like Saran F-310 from The Dow Chemical Company which can be deposited on top of the transient document sheet from solution, Capran®oxyshield™ OBS which is a monoaxially oriented coextruded nylon6/EVOH/nylon 6 clear film from Honeywell International and which can be used to encapsulate the transient document, Saran wrap® from Dow Chemicals, polyethylene vinyl alcohol, polyvinylidene chloride. In embodiments, the protective material may also reduce physical deterioration of the reimageable medium due to for example handling/scratching. The protective material may be a transparent resin including for example polyvinyl alcohol, polycarbonate, or acrylic resin, or a mixture thereof. The protective material may be in the form of a separate layer over the photochromic material. In another embodiment, the protective material and the photochromic material form a single layer over the substrate. In a further embodiment, the protective material and the photochromic material are both impregnated or embedded into a porous substrate such as paper.

In embodiments where both a protective material and a light absorbing material are present in the reimageable medium, the protective material and the light absorbing material may be present in the same or different layer. If present in different layers, the protective material may be located over the light absorbing material or vice versa.

Exemplary configurations of the reimageable medium include the following in the recited sequence from top to bottom (for each layer, a number of illustrative components are recited with illustrative amounts):

Configuration 1 (two-sided reimageable medium): 1) having optional top layer (100% by weight protective material but if includes an optional light absorbing material then about 5 to about 95 percent by weight protective material/about 95 to about 5 percent by weight light absorbing material based on weight of top layer); 2) a porous two-sided substrate impregnated or embedded with photochromic material and crystalline polymeric binder such that the photochromic material is present on both sides of the porous substrate to create a two-sided reimageable medium (about 1% to about 50 percent by weight photochromic material in the binder; and 3) optional bottom layer (100% by weight protective material but if includes an optional light absorbing material then about 5 to about 95 percent by weight protective material/about 95 to about 5 percent by weight light absorbing material based on weight of bottom layer).

Configuration 2 (two-sided reimageable medium): 1) having optional top layer (protective material); 2) first light sensitive layer (1% to about 50% by weight photochromic material in the crystalline polymeric binder, but if there is included an optional light absorbing material, then about 1 to about 50 percent by weight photochromic material/about 5 to about 95 percent by weight binder/about 5 to about 95 percent by weight light absorbing material based on weight of this layer); 3) substrate; 4) second light sensitive layer (1 to about 50 percent by weight photochromic material in the crystalline polymeric binder, but if there is included an optional light absorbing material then about 1 to about 50 percent by weight photochromic material/about 5 to about 95 percent by weight binder/about 5 to about 95 percent by weight light absorbing material based on weight of this layer); and 5) optional bottom layer (protective material).

Configuration 3 (one-sided reimageable medium): having 1) optional top layer (protective material); 2) optional intermediate layer (100 percent by weight protective material but if there in included an optional light absorbing material then about 5 to about 95 percent by weight protective material/about 95 to about 5 percent by weight light absorbing material based on weight of top layer); 3) light sensitive layer (1 to about 50 percent by weight photochromic material in the crystalline polymeric binder, but if includes optional light absorbing material then about 1 to about 50 percent by weight photochromic material/about 5 to about 95 percent by weight binder/about 5 to about 95 percent by weight light absorbing material based on weight of this layer); and 4) substrate.

For any reimageable side of the medium, the entire side or only a portion of the side is reimageable.

Where there are two or more layers in the reimageable medium, each of the layers may be the same or different from the other. For example, where there are a top layer (protective material) and a bottom layer (protective material), the two layers may be the same; alternatively, the top and bottom layers may differ in one or more respects such as the particular protective material used, the layer thickness, and the ratio of the different materials (in the embodiments where each layer includes a mixture of two or more different protective materials).

In the configurations described herein, each layer (e.g., top layer, intermediate layer, light sensitive layer, and bottom layer) may have a dry thickness of any suitable value ranging for example from about 1 micrometer to about 100 micrometers, particularly from about 2 micrometer to about 50 micrometers.

Any suitable techniques may be used to form the reimageable medium. For example, to deposit the components described herein, typical coating techniques include, but are not limited to, vacuum deposition, spin coating, dip coating, spray coating, draw bar coating, doctor blade coating, slot coating, roll coating and the like, while the coating composition made of photochromic compound, melted polymeric binder and optional materials is kept hot, i.e. in liquid state. [Please correct for this case]

After coating the coated substrate is allowed to cool down to the room temperature, then the coating composition becomes solid because the crystalline polymeric binder becomes solid. The coated substrate is now ready for use if no other optional protective coatings are applied onto it.

In embodiments of the present reimageable medium, the reimageable medium is capable of any suitable number of cycles of temporary image formation and temporary image erasure ranging for example from about 5 cycles to about 1,000 cycles, or from about 10 cycles to about 100 cycles, without significant chemical degradation of the photochromic material and the other components. In embodiments of the present method, after undergoing the initial cycle of temporary image formation and temporary image erasure, the reimageable medium optionally undergoes a number of additional cycles of temporary image formation and temporary image erasure ranging from 1 additional cycle to about 1,000 additional cycles, or from 3 additional cycles to about 100 additional cycles. When there is a plurality of cycles of temporary image formation and temporary image erasure, each temporary image may be the same or different from each other, and each temporary image may be present on the same or different region of the reimageable medium.

The medium has a characteristic that when the temporary image is exposed to an indoor ambient condition for an image erasing time, the color contrast changes to the absence of the color contrast to erase the temporary image in all of the following: (i) when the indoor ambient condition includes darkness at ambient temperature, (ii) when the indoor ambient condition includes indoor ambient light at ambient temperature, and (iii) when the indoor ambient condition includes both the darkness at ambient temperature and the indoor ambient light at ambient temperature.

In embodiments, the medium has an additional characteristic that the color contrast changes to the absence of the color contrast to erase the temporary image in the following: (iv) when the medium is exposed to an elevated temperature generated by an image erasure device.

In embodiments, the medium has another characteristic that the color contrast changes to the absence of the color contrast to erase the temporary image in the following: (v) when the medium is exposed to an image erasure light generated by an image erasure device.

In embodiments of the present method, it is optional to use an image erasure device. However, other aspects of the present invention also include the reimageable medium itself and the reimageable medium in embodiments may optionally have characteristics as described herein that allow it to be used with an image erasure device. The optional image erasure device may be any suitable device that causes erasure of the temporary image by inducing a portion of the photochromic material to change to a different form having a different color (such as from purple to yellow, or from purple to colorless where colorless is considered a color in this context). The image erasure device may be for example a heating device capable of generating an elevated temperature (any suitable temperature above the ambient temperature) ranging for example from about 50 degrees C. to about 200 C such as for example an oven or a hot air blower device. The optional image erasure device may be an artificial light source which generates an image erasure light having a broad band, a narrow band, or a single wavelength within a wavelength range of for example about 200 nm to about 700 nm. The image erasure device may be operated for any effective time period such as a time period ranging for example from about 10 seconds to about 1 hour, or from about 30 seconds to about 30 minutes.

The following discussion of general operational principles (involving exemplary embodiments) provides further information on various aspects of the present invention. For simplicity of discussion, the photochromic material is composed of only one type. In embodiments, a side of the reimageable medium may initially have the same color where the molecules of the photochromic material are all of the same first form. The imaging light directed towards a selected region of the reimageable medium causes the photochromic material in the exposed region to change to a different second form, which has a different color. There then exists a color contrast between the exposed region and the non-exposed region to allow a temporary image to be visible to an observer. It is noted that the color of the exposed region and the color of the non-exposed region seen by the observer may be a combination of a number of colors including for example the color of the substrate, the color of the photochromic material in that region, and the color of any other optional component. Where the first form of the photochromic material is colorless, then the color of the non-exposed region may be primarily determined by the color of the substrate. When the temporary image erases on its own under an indoor ambient condition, the interconversion of the second form of the photochromic material to the first form in the exposed region may be due to thermal absorption (ambient temperature), or to light absorption (indoor ambient light), or to a combination thereof. It is understood that the indoor ambient conditions of indoor ambient light (at ambient temperature) and darkness (at ambient temperature) can be combined in the context that they can be used sequentially in any order.

Specific embodiments will now be described in detail. These examples are intended to be illustrative, and the invention is not limited to the materials, conditions, or process parameters set forth in these embodiments. All parts and percentages are by weight unless otherwise indicated.

EXAMPLES

Example I

Transient Document Sheet Fabrication

A mixture of 0.2 g of spiropyran (1) and 4.5 g of Polywax® 500 was heated on a hotplate at 130° C. Polywax® melted and the spiropyran was dissolved in the melted Polywax®. In this way, a uniform composition was fabricated, which is in a liquid state. This composition was coated hot on a sheet of white paper (Xerox® Multipurpose 4024), by using a blade (gap was 1 mil). During the coating process, the paper was also heated, to ensure uniform coating. Immediately after coating the paper was removed from the hot plate, and was cooled down. This was the sheet of transient document ready to be used for imaging.

The amount of coating onto the paper was relatively very low and the largest part of the coating was impregnated into the paper sheet. As a result the paper was as flexible as sheets made by previous methods and of course, it maintained a paper-like appearance.

Example 2

Writing/Erasing on Paper

Paper was imaged by illumination with UV light (365 nm) for 30 seconds. The optical density for the white state was OD=0.15 (comparable with 0.12 which was found on standard-made transient documents). The optical density of the colored state was OD=0.97. This compares well with 1.1, which was measured in the same conditions, for transient documents made by a standard procedure. Standard procedure uses xylenes as a solvent.

The reflectance spectra of the sheet in the white and colored states are shown in FIG. 1.

White state reflectance of a transient document sheet of paper coated according to the procedure disclosed is shown in FIG. 1. White state reflectance (blue line). Colored state reflectance (red line).

Self-erasing time was about 30 hours. After self-erasing the sheet was ready to be written with new information.

Example 3

Preparation of Transient Document

A sheet was prepared by using the procedure in Example 1, except that the polyethylene was Polywax® 1000. The sheet performed in the same way as Example 1.

Polywax® 1000 is advantageous when compared with other waxes, because it has a higher melting point. Transient documents can be fast erased by heating at about 90-100° C. At this temperature, some waxes, which melt at about 80° C., create a problem when the paper is erased, because the wax will be removed from the paper and may damage the paper path in the printer. Polywax® 1000 solves this problem because it melts at about 110° C. Polywax® with even higher melting temperature may be used. For example Polywax® 2000 melts at about 125° C.

Example 4

Preparation of Transient Document

A sheet was coated by using the procedure described above in Example 1, but by using a different spiropyrans (compounds 2 and 3) and Polywax® 1000. The paper had a bluish appearance on the white state. Compound 2 may be advantageous because of the presence of a methoxy group, which may increase its solubility in the binder.

Compound 2

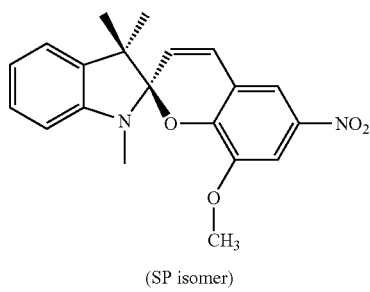

(SP isomer)

Compound 3

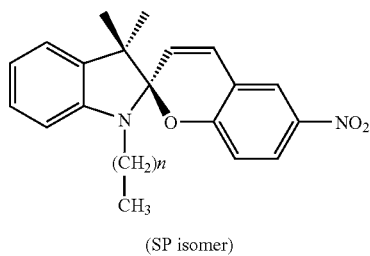

(SP isomer)

wherein n is from about 0 to about 30, or from about 0 to about 20, or from about 1 to about 10.

Example 5

Xerox® Multipurpose 4024 was coated by the procedure described in Example 1, except that in each case a different crystalline polymer was used. In all cases, a contrast ratio was obtained after writing information as described in Example 2. Results with these polymers are summarized in Table 1 below.

TABLE 1

| Polymer | Polymer/Spiropyran (1) Ratio | Contrast Ratio |
| --- | --- | --- |
| Polywax 1000 (Baker Petrolite) | 5 g/0.15 g | 5.5 |
| Elvax 200W (DuPont) | 5 g/0.15 g | 63 |
| PW1000/Elvax 200 (4/1; w/w) | 5 g/0.20 g | 6.6 |
| PW1000/Elvax 200 (3/2; w/w) | 5 g/0.15 g | 9.6 |
| Ethylene carbon monoxide copolymer (Allied Signal) | 5 g/0.14 g | 4.8 |
| Unirez 2974 (Arizona Chemicals) | 5 g/0.15 g | 4.2 |
| Kemamide S 180 | 5 g/0.15 g | 2.8 |
| Sicolub OA5 (BASF) | 5 g/0.15 g | 3.8 |
| Unithox 480 | 5 g/0.15 g | 5.1 |
| Luwax E (BASF) | 5 g/0.15 g | 5.6 |
| Wax-O-Flakes (Hoechst) | 5 g/0.15 g | 7.4 |

TABLE 1-continued

| Polymer | Polymer/Spiropyran (1) Ratio | Contrast Ratio |
| --- | --- | --- |
| Unilin 550 (Baker Hughes) | 5 g/0.15 g | 6.8 |
| X-2073 (Baker Hughes) | 5 g/0.15 g | 6.0 |
| Mekon wax (Baker Hughes) | 5 g/0.15 g | 5.6 |

Other embodiments and modifications may occur to those of ordinary skill in the art subsequent to a review of the information presented herein; these embodiments and modifications, as well as equivalents thereof, are also included within the scope herein.

The recited order of processing elements or sequences, or the use of numbers, letters, or other designations therefor, is not intended to limit a claimed process to any order except as specified in the claim itself.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An image forming method comprising:
   (a) providing a reimageable medium comprised of a substrate and a photochromic material, wherein the medium is capable of exhibiting a color contrast and an absence of the color contrast;
   (b) using an imaging light at an ultraviolet wavelength ranging from about 200 nm to about 475 nm to expose the medium corresponding to a predetermined image to result in an exposed region and a non-exposed region, wherein the color contrast is present between the exposed region and the non-exposed region to allow a temporary image corresponding to the predetermined image to be visible for a visible time;
   (c) subjecting the temporary image to an indoor ambient condition for an image erasing time to change the color contrast to the absence of the color contrast to erase the temporary image without using an image erasure device; and
   (d) optionally repeating procedures (b) and (c) a number of times to result in the medium undergoing a number of additional cycles of temporary image formation and temporary image erasure, wherein said reimageable medium is prepared by a solvent-less process comprising i) heating and melting a photochromic material and a polymer to form a coating composition, and ii) coating said coating composition onto at least one side of a transient document substrate.

2. An image forming method in accordance with claim 1, wherein said photochromic material is selected from the group consisting of spiropyrans, spirooxazines, spirothiopryans, stilbenes, aromatic azo compounds, benzopyrans, naphthopyrans, bisimidazoles, spirodihydroindolizines, photochromic quinines, perimidinespirocyclohexadienones, photochromic viologens, fulgides, fulgimides, diarylethenes, triarylmethanes, anus, and mixtures thereof.

3. An image forming method in accordance with claim 2, wherein said photochromic material is a spiropyran having the following formula

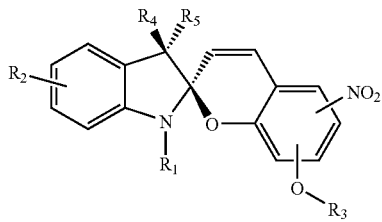

wherein $R_1$, $R_2$, $R_3$, $R_4$ and $R_5$ can be the same or different, and are selected from the group consisting of hydrogen, an alkyl having from about 1 to about 50 carbons, a cycloalkyl having from about 4 to about 10 carbons, an aryl having from about 6 to about 30 carbon atoms, and an arylalkyl having from about 7 to about 50 carbon atoms.

4. An image forming method in accordance with claim 2, wherein said photochromic material is a spirooxazine.

5. An image forming method in accordance with claim 1, wherein said polymer has a melting point of from about 60 to about 300° C.

6. An image forming method in accordance with claim 1, wherein said polymer is selected from the group consisting of polyethylenes, oxidized wax, crystalline polyethylene copolymers, crystalline polyamides, polyester amides, polyvinyl butyral, polyacrylonitrile, polyvinyl chloride, polyvinyl alcohol hydrolyzed, polyacetal, poly(ethylene oxide), poly(ethylene terephthalate), poly(ethylene succinate), crystalline cellulose polymers, fatty alcohols, ethoxylated fatty alcohols, and mixtures thereof.

7. An image forming method in accordance with claim 1, wherein said photochromic material is present in the coating composition in an amount of from about 0.01 to about 50 percent by weight of total solids.

8. An image forming method in accordance with claim 1, wherein said polymer is present in the coating composition in an amount of from about 5 to about 90 percent by weight of total solids.

9. An image forming method in accordance with claim 1, wherein during i), a light absorbing material is added.

10. An image forming method in accordance with claim 9, wherein said light absorbing material is an antioxidant.

11. An image forming method in accordance with claim 1, wherein the substrate is paper.

12. An image forming method in accordance with claim 11, wherein the substrate is white paper.

13. An image forming method in accordance with claim 1 wherein the substrate is plastic.

14. An image forming method in accordance with claim 1, wherein the substrate is flexible.

* * * * *